US012812289B2

(12) United States Patent
Sun et al.

(10) Patent No.: US 12,812,289 B2
(45) Date of Patent: Nov. 24, 2026

(54) DEVICES, METHODS, AND SYSTEMS FOR REDUCING THE OCCLUSION EFFECT

(71) Applicant: Google LLC, Mountain View, CA (US)

(72) Inventors: Guohua Sun, Santa Clara, CA (US); Jae Lee, Palo Alto, CA (US)

(73) Assignee: Google LLC, Mountain View, CA (US)

(*) Notice: Subject to any disclaimer, the term of this patent is extended or adjusted under 35 U.S.C. 154(b) by 251 days.

(21) Appl. No.: 18/702,281

(22) PCT Filed: Oct. 19, 2022

(86) PCT No.: PCT/US2022/078390
§ 371 (c)(1), (2) Date: Apr. 17, 2024

(87) PCT Pub. No.: WO2023/070005
PCT Pub. Date: Apr. 27, 2023

(65) Prior Publication Data
US 2024/0348969 A1 Oct. 17, 2024

Related U.S. Application Data

(60) Provisional application No. 63/257,791, filed on Oct. 20, 2021.

(51) Int. Cl.
*H04R 1/10* (2026.01)

(52) U.S. Cl.
CPC ....... *H04R 1/1083* (2013.01); *H04R 2460/05* (2013.01)

(58) Field of Classification Search
CPC .......................... H04R 2460/05; H04R 1/1083
See application file for complete search history.

(56) References Cited

U.S. PATENT DOCUMENTS 10,715,932 B2 * 7/2020 Liebich .................. H04R 25/30
2017/0148428 A1 5/2017 Thuy et al.
(Continued)

FOREIGN PATENT DOCUMENTS

| | | |
|---|---|---|
| DE | 102016011719 | 9/2017 |
| WO | 2021098949 | 5/2021 |
| WO | 2023070005 | 4/2023 |

OTHER PUBLICATIONS

"International Search Report and Written Opinion", Application No. PCT/US2022/078390, Feb. 8, 2023, 11 pages.
(Continued)

*Primary Examiner* — David L Ton
(74) *Attorney, Agent, or Firm* — Colby Nipper PLLC

(57) ABSTRACT

A wearable device includes a feedforward microphone; a feedback microphone; a voice accelerometer; and one or more processors in communication with the feedforward microphone, the feedback microphone, and the voice accelerometer. The one or more processors may be configured to receive an occlusion effect ("OE") profile associated with increased sound pressure level within an ear canal; determine an OE gain profile based on the OE profile; receive voice accelerometer data; adjust the OE gain profile based on the voice accelerometer data; generate an OE cancellation signal based on the OE gain profile to equalize the OE profile; receive, from the feedforward microphone, first audio content including external audio; receive, from the feedback microphone, second audio content including audio within the ear canal of a user; and adjust, based on the OE cancellation signal and the received first and second audio content, an audio output.

20 Claims, 7 Drawing Sheets

(56) References Cited

U.S. PATENT DOCUMENTS

| | | | |
|---|---|---|---|
| 2018/0047381 | A1 | 2/2018 | Gauger et al. |
| 2018/0115839 | A1 | 4/2018 | Eichfeld et al. |

OTHER PUBLICATIONS

Leibich, et al., "Active Occlusion Cancellation with Hear-Through Equalization for Headphones", Apr. 15, 2018, pp. 241-245.

"International Preliminary Report on Patentability", Application No. PCT/US2022/078390, Apr. 23, 2024, 7 pages.

"Foreign Office Action", EP Application No. 22802476.6, May 7, 2026, 12 pages.

* cited by examiner

DEVICES, METHODS, AND SYSTEMS FOR REDUCING THE OCCLUSION EFFECT

RELATED APPLICATION(S)

This application is a national stage entry of International Application No. PCT/US2022/078390, filed Oct. 19, 2022, which claims the benefit of U.S. Provisional Application No. 63/257,791, filed Oct. 20, 2021, the disclosures of which are incorporated herein by reference in their entirety.

BACKGROUND

Wearable hearing devices, such as headphones or earbuds, often include an active noise control system that generates noise cancellation signals based on microphone inputs. The microphone inputs are filtered using a digital signal processing engine that generates sound waves. The sound waves are then superimposed with the primary sound wave within a user's ear. The microphone inputs are filtered using a digital signal processing engine that generates sound waves. The sound waves are superimposed with the primary sound wave within a user's ear. This may isolate and remove the ambient noises.

Wearable devices may include an active noise control system that generates anti-sound based on microphone inputs. One of the challenges created by use of a headphone or earbud in the ear of a user is that the circumaural ear-cup or ear-tip of the headphone or earbud seals the users from the environment. This causes an increased sound pressure level inside the ear canal while a user talks or chews, and the frequency of the sound is typically seen in the lower frequencies, often below 800 HZ. This effect is commonly known as the Occlusion Effect ("OE") which is physically caused by sound pressure from body-conducted sound that resonates inside the ear canal occluded by the earbuds. Acoustic transparency control ("XPC") features have been implemented to help reduce the occlusion effect and provide full transparency of ambient sound, as in a fully open ear canal. XPC features typically use one microphone placed external to the microphone to detect ambient sound, processing through a digital signal processor ("DSP"), and playback into the ear canal to provide ambient awareness. However, improvements are needed to improve existing OE processing solutions.

SUMMARY

This document describes devices, methods, and systems directed to reducing the occlusion effect. According to a first aspect of the disclosure, a wearable device may include a feedforward microphone; a feedback microphone; a voice accelerometer; and one or more processors in communication with the feedforward microphone, the feedback microphone, and the voice accelerometer. The one or more processors may be configured to receive an OE profile associated with increased sound pressure level within an ear canal; determine an OE gain profile based on the OE profile; and generate an OE cancellation signal based on the OE gain profile. This document also describes optional aspects that may include one or more of the following features. Receive voice accelerometer data. Adjust the OE gain profile based on the voice accelerometer data to equalize the OE profile. Receive, from the feedforward microphone, audio content including external audio. Adjust, based on the adjusted OE gain profile, the OE cancellation signal, and the received audio content, an audio output.

According to a second aspect of the disclosure, a method comprises receiving, by one or more processors, an OE profile associated with increased sound pressure level within an ear canal; determining, based on the OE profile, an OE gain profile; and generate an OE cancellation signal based on the OE gain profile. This document also describes optional aspects that may include one or more of the following features. Receiving, from a voice accelerometer, voice accelerometer data. Adjusting, by one or more processors, the OE gain profile to equalize the OE profile based on the voice accelerometer data. Receiving, from one or more microphones, audio content including at least one of external audio and playback audio. Adjusting, based on the adjusted OE gain profile, the OE cancellation signal, and the received audio content, an audio output.

According to a third aspect of the disclosure, a system including one or more microphones, one or more voice accelerometers, one or more processors, and memory comprising instructions stored thereon, which when executed by the one or more processors cause the one or more processors to receive an OE profile associated with increased sound pressure level within an ear canal; determine an OE gain profile based on the OE profile; generate an OE cancellation signal based on the OE gain profile. This document also describes optional aspects that may include one or more of the following features. Receiving voice accelerometer data. Adjusting the OE gain profile based on the voice accelerometer data to equalize the OE profile. Receiving, from one or more microphones, audio content including external audio. Adjusting, based on the adjusted OE gain profile, the OE cancellation signal, and the received audio content, an audio output. Further configuring the one or more processors to generate the OE profile.

According to a fourth aspect of the disclosure, a non-transitory computer readable medium storing instructions, which when executed by one or more processors, cause the one or more processors to: receive an OE profile associated with increased sound pressure level within an ear canal; determine an OE gain profile based on the OE profile; generate an OE cancellation signal based on the OE gain profile; receive voice accelerometer data; adjust the OE gain profile based on the voice accelerometer data to equalize the OE profile; receive, from one or more microphones, audio content including external audio; and adjust, based on the adjusted OE gain profile, the OE cancellation signal, and the received audio content, an audio output.

This Summary is provided to introduce simplified concepts for devices, methods, and systems directed to reducing the occlusion effect, which are further described below in the Detailed Description and are illustrated in the Drawings.

BRIEF DESCRIPTION OF THE DRAWINGS

A more complete appreciation of the subject matter of the present technology and the various advantages thereof may be realized by reference to the following detailed description which refers to the accompanying drawings, in which.

DETAILED DESCRIPTION

Figure 1A:
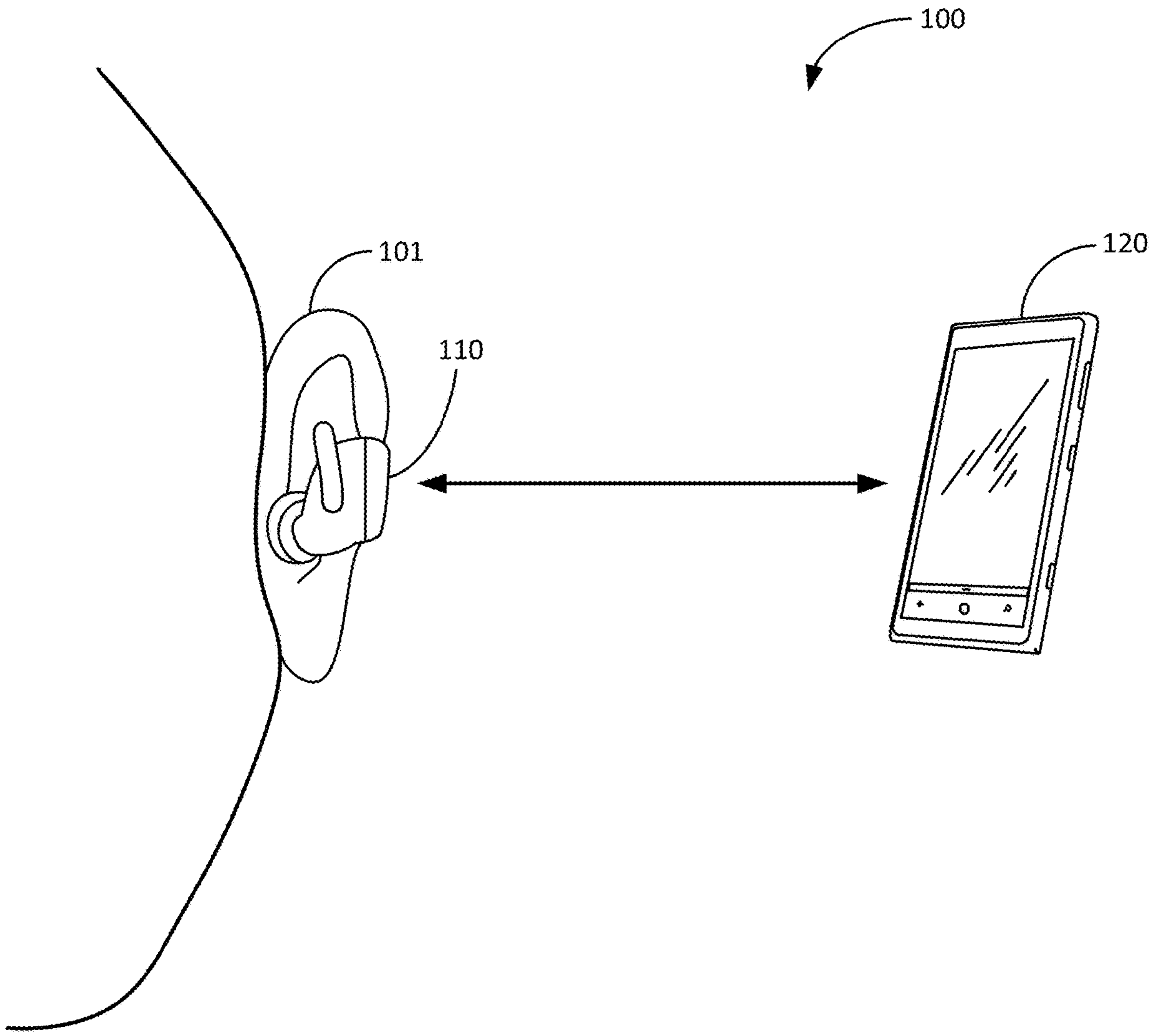
FIG. 1A is a pictorial diagram of an example wearable device according to aspects of the disclosure.

This document describes devices, methods, and systems directed to reducing the occlusion effect. An adaptive occlusion effect ("OE") cancellation mechanism is provided that can adjust transparency level relative to both ambient air and bone conducted sound levels. The system combines hybrid filtering topology (feedforward plus feedback digital signal processing ("DSP") control system), as well as a dynamic voice tracking algorithm based on voice accelerometer data to adapt the DSP to specific users. The proposed system can be processed in a low-latency DSP path and integrated with a feedback noise cancelling system to alleviate the OE.

A wearable device, such as an earbud, may include an adaptive OE cancellation mechanism to equalize the occlusion effect. In addition to a feedforward microphone and feed-back microphone, a voice accelerometer may be implemented within the wearable device. The device may access an OE profile indicating one or more frequency ranges reflecting the OE. The OE profile may be on of a plurality of available OE profiles. Based on the OE profile, the digital signal processor may create or access an OE filter or gain profile which can equalize the OE profile with an OE cancellation signal to bring the OE to 0 dB or as close to 0 dB as possible in order to create an "open ear" or transparency effect via obviating the OE. However, the initial OE gain profile may be insufficient to fully attenuate OE due to variances in the OE specific to a user. To better account for these variances, voice accelerometer data received from a voice accelerometer adjacent the ear of a user and/or an audio signal received from a feedback microphone can be used to adjust the OE gain profile. Based on the voice accelerometer data and/or the audio signal received from the feedback microphone, a further filter can be selected to adjust the OE gain profile upward or downward at different frequencies to account for the variations caused by voice, in addition to adjusting the OE cancellation signal based on the adjusted OE gain profile. This helps to equalize the OE and achieve transparency of bone-conducted sound. To achieve full transparency, ambient or air-conducted sound detected by the feedforward and/or the feedback microphones can also be processed and equalized. Audio output based on the adjusted OE gain profile, adjusted OE cancellation signal, and the equalized ambient sound can enhance the user listening experience and provide for full transparency of sound, despite occlusion in the ear canal by the wearable device.

The adaptive hearing control ("AHC") block of a device in a system may receive an OE profile reflecting the average OE. In some examples, the OE profile may be a fixed average profile that can be stored in memory and accessed by the AHC block. In some examples, the OE profile may be one of a plurality of available OE profiles stored in memory and accessed by the AHC block. Based on the OE profile and voice accelerometer detection ("VAD") by the voice accelerometer, the AHC block may create or access an OE gain profile indicating frequency ranges that may require a positive gain or a negative gain to create an OE cancellation signal to minimize the OE. This helps to equalize bone-conductive sound from within the user's ear. Ambient sound detected external to the ear may also be equalized. The combination of equalized bone-conducted sound and ambient sound can help to achieve full transparency of sound, as if the user was not wearing the wearable device.

Example Systems, Devices, and Methods

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1B:
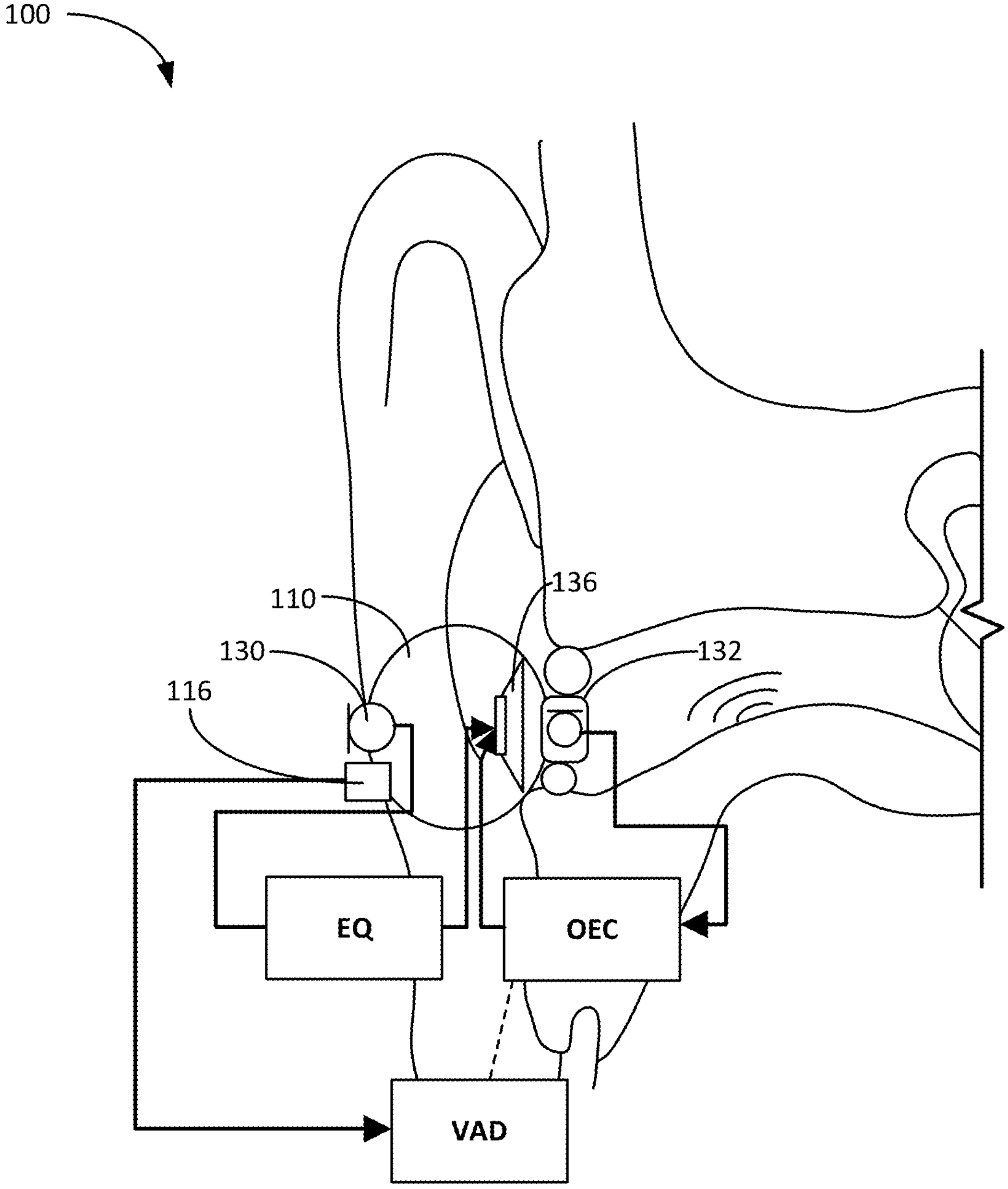
FIG. 1B is another pictorial diagram illustrating components of the example wearable electronic device.

FIG. 1A illustrates an example system 100 that includes a wearable device 110, which includes, without limitation, earbuds or earphones that can be worn in the ear 101 of a user. Although not required, wearable device 110 may be wirelessly coupled to a device 120 that in some examples, can be used to perform processes or store or access data necessary to achieve adaptive hearing control in the wearable device 110. As shown in more detail in FIG. 1B, the wearable device 110 can further include a plurality of microphones, including at least one feedforward microphone 130, at least one feedback microphone 132, a voice accelerometer 116, and a speaker 136. Wearable device 110 may include an OE effect mechanism that incorporates VAD, in combination with OE cancellation ("OEC") to achieve equalization of bone-conducted sound, as well as an equalizer ("EQ") for ambient sound, some or all of which collectively provide for transparency of sound, also known as an "open ear" sound or non-occluded sound for a user.

Figure 1C:
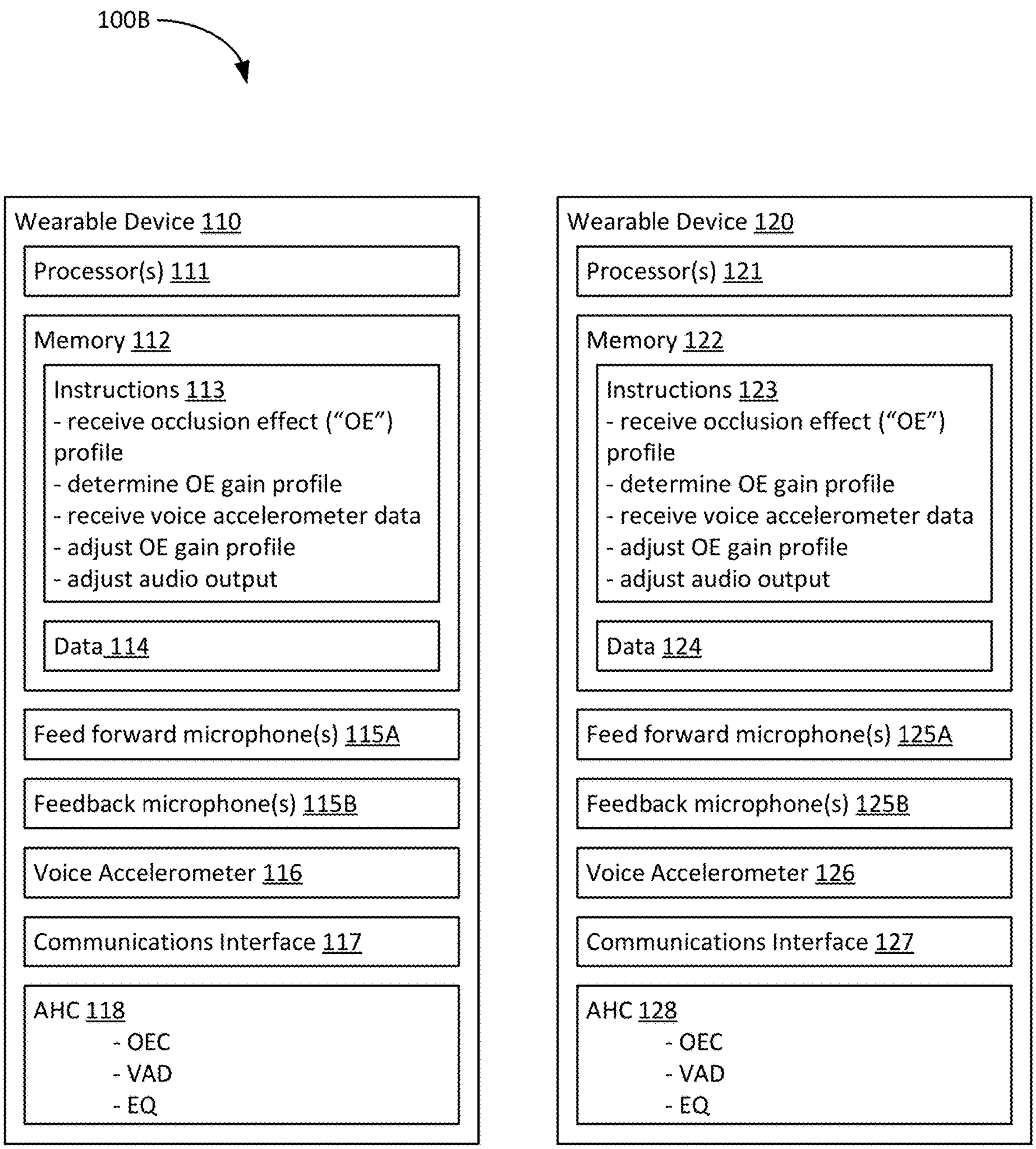
FIG. 1C is a functional block diagram of an example system in accordance with aspects of the disclosure.

FIG. 1C illustrates an example system 100B in which the features describe above and herein may be implemented. It should not be considered as limiting the scope of the disclosure or usefulness of the features described herein. As shown in this example, system 100B may include wearable device 110 and optionally, an external device 120. Wearable device 110 may contain one or more processors 111, memory 112, instructions 113, data 114, one or more microphones, voice accelerometer 116, a wireless communication interface or antenna 117, and an AHC block 118. A device 120 can be wirelessly coupled to the wearable device 110 via short-range communication, such as Bluetooth, Bluetooth low energy (BLE), etc. The device 120 may be any device or accessory, such as a smart phone, mobile phone, wireless-enable PDAs, tablet PC, a netbook configured to obtain information via the Internet or other networks, wearable computing devices (e.g., a smartwatch, headset, smart glasses, virtual reality player, other head-mounted display, etc.), wireless speakers, home assistants, gaming consoles, etc.

The one or more processors 111 may be any conventional processors, such as commercially available microprocessors. Alternatively, the one or more processors may be a dedicated device such as an application specific integrated circuit (ASIC) or other hardware-based processor. Although FIG. 1B functionally illustrates the processor, memory, and other elements of wearable device 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of wearable device 110. Accordingly, references to a processor or computing device will be understood to include references to a collection of processors or computing devices or memories that may or may not operate in parallel.

Memory 112 may store information that is accessible by the processors, including instructions 113 that may be executed by the processors 111, and data 114. The memory 112 may be a type of memory operative to store information accessible by the processors 111, including a non-transitory computer readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 113 and data 114 are stored on different types of media.

Memory 112 may be retrieved, stored or modified by processors 111 in accordance with the instructions 113. For instance, although the present disclosure is not limited by a particular data structure, the data 114 may be stored in computer registers, in a relational database as a table having a plurality of different fields and records, XML documents, or flat files. The data 114 may also be formatted in a computer readable format such as, but not limited to, binary values, ASCII or Unicode. By further way of example only, the data 114 may be stored as bitmaps comprised of pixels that are stored in compressed or uncompressed, or various image formats (e.g., JPEG), vector-based formats (e.g., SVG) or computer instructions for drawing graphics. Moreover, the data 114 may comprise information sufficient to identify the relevant information, such as numbers, descriptive text, proprietary codes, pointers, references to data stored in other memories (including other network locations) or information that is used by a function to calculate the relevant data.

The instructions 113 can be any set of instructions to be executed directly, such as machine code, or indirectly, such as scripts, by the processor 111. In that regard, the terms "instructions," "application," "steps," and "programs" can be used interchangeably herein. The instructions 113 can be stored in object code format for direct processing by the processor, or in any other computing device language including scripts or collections of independent source code modules that are interpreted on demand or compiled in advance. Functions, methods and routines of the instructions are explained in more detail below.

The wearable device 110 may include one or more microphones, including a feedforward microphone 115A and a feedback microphone 115B. The microphones of wearable device 110 may be located on a surface of the housing of wearable device 110 that is exposed when wearable device 110 is worn on the body. In some examples, the feedforward microphone(s) 115A of wearable device 110 may be located on or adjacent a surface of the earbud housing facing away from the body. Similarly, the feedback microphone(s) 115B of wearable device 110 may be positioned at or adjacent a surface of the earbud housing that is in contact with the body when wearable device 110 is worn on the body. The microphones 115A, 115B may each be able to receive audio input. In other examples, the voice accelerometer 116 may be positioned on another wearable device, such as jewelry, a clothing attachment and the like.

The wearable device 110 may also include a voice accelerometer 116. The voice accelerometer 116 may be positioned anywhere on the wearable device 110, and in some examples, is positioned adjacent a surface of the earbud housing that faces away from the ear canal of a user. The voice accelerometer may operate as a voice transducer configured to sense acceleration in at least one dimension and have a vibration sensitivity suitable for obtaining meaningful information about the voice. In some examples, the voice accelerometer(s) 116 may detect vibration of the user's voice through the bone, such as through the skull. This information can be used to determine frequency and/or bandwidth of the user's voice. The audio input from the feedback microphone 115B, and input from the voice accelerometer 116 may be processed by the AHC block 118 based on the user's adjusted OE gain profile, as will be discussed in more detail herein.

The wearable device 110 may further include a wireless communication interface 117, such as an antenna, transceiver, and any other devices used for wireless communication. The antenna may be, for example, a short-range wireless network antenna. The wearable device 110 may be able to be coupled with host device 120 via a wireless connection. For instance, the wireless communication interface 117 may be used to transmit and receive Bluetooth signals, WiFi signals or signals that use other short range wireless technologies.

The wearable device 110 may include an AHC block 118. The AHC block 118 may receive input from components of the wearable device 110. For example, AHC block 118 may receive audio input from the feedforward microphone(s) 115A and feedback microphone(s) 115B, as well as input from the voice accelerometer 116. For example, the AHC block 118 may receive noise created by a user's voice as input from voice accelerometer 116, based on voice vibrations within the body. The feedforward microphone 115A, which is an externally facing microphone, may receive ambient or external noise as audio input. External noise may be noise that is happening around the user, such as traffic, construction, machines operating, indistinct chatter, and the voice of a user perceived by the user as an external sound. The AHC block 118 may receive input from the feedback microphone 115B, that is configured to be in contact with the body and that can detect sound within the ear canal of a user. The feedback microphone 115B may further receive audio output by the wearable device. For example, feedback microphone 115B may further receive as input what the wearable device 110 is outputting to the user.

Based on the audio input received by each of the feedforward microphone 115A, feedback microphone 115B, and the input from the voice accelerometer 116, the AHC block 118 may determine what noise is ambient noise, what noise is attributed to the user's voice, what noise is intended for output to the user, etc. The AHC block 118 may adjust the audio output via an OE cancellation signal based on the adjusted OE gain profile and the received audio. In some examples, the AHC block 118 may output a set of noise control benefits to modify the way the audio is being perceived by the user.

The AHC block 118 may adjust the overall audio output of the wearable device and collectively achieve equalization or transparency of sound using one or more adjustment modules. For example, the AHC block may include at least an OEC module and a VAD module to adjust for bone-conducted sound, and an EQ module to adjust for ambient or air-conducted sound. These modules may comprise instructions that may be executed by processor 111 or may be implemented as integrated circuitry, e.g., an ASIC, a DSP residing on processor 111 or a portion of circuitry residing on processor 111. In some examples, to address bone-conducted sound, the AHC block 118 may receive audio input received by the feedback microphone 115B. The AHC block 118 may process the audio input based on an OE gain profile. The AHC block 118 may further adjust the OE gain profile based on VAD. Adjusting the audio output may include applying a positive or negative gain to a certain frequency range. For example, the OEC module can apply a negative gain, whereas the VAD module may apply a positive gain or vice versa. The OEC module and VAD module can also both apply a positive gain or both apply a negative gain. The amount of gain may be different for each module and, in some examples, may depend on frequency of the audio. The amount of the gain may be determined using a least mean square algorithm and/or a machine-learned model. Similarly, ambient sound can be equalized by the EQ module using known methods of equalizing ambient sound.

Looking first to achieving transparency of bone conducted sound, the AHC block 118, and therefore the OEC module may receive content, such as an OE profile. One or more stored OE profiles may be accessed by processor 111. For example, the OE profile may indicate the OE created in the ear of a user, such as bone-conducted sound, due to pressure resonating from inside the ear canal when occluded by the wearable device. The OE profile may indicate the OE across a wide range of frequencies. In one example, the OE profile may be an average or standard mean OE profile based on OE data collected from a plurality of users.

The OE profile may be a fixed profile stored in memory 112 of the wearable device 110. In other examples, the OE profile may be stored in the memory 112 of another device, such as device 120, and accessed by the wearable device 110. In still other examples, a real time OE profile can be created by the wearable device 110 (or other device) when the wearable device 110 is worn by the user.

The OEC module may further receive an OE gain profile, which may require a positive gain or a negative gain to provide the user with a more natural listening experience. The OE gain profile can be used to determine an audio output to include an OEC signal to compensate for the occlusion effect. The OE gain profile may indicate a certain amount of gain or loss for given frequency of ranges that will be required to achieve transparency of sound within the ear of a user, including bone conducted sound. In some examples, the OE gain profile may be an inverse function of the OE profile. The OE gain profile can be stored in memory 112 of wearable device 110 and/or memory 122 of external device 120. Alternatively, in some examples, the processor 111 may generate an OE gain profile by calculating an inverse function of the initial OE profile. In some examples, the processor 111 may generate an OE gain profile and/or the OEC signal by using a machine-learned model stored in memory 112.

In some examples, there may be a different OE gain profile for each ear. For example, the right ear and the left ear may experience different or varying degrees of occlusion effect. Due to placement of the earbuds within the ear, the occlusion effect in one ear may be different than the OE in the other ear. Thus, the OE profile for one ear may be different than the left ear.

The VAD module may further adjust the OE gain profile. In some examples, VAD module processes voice accelerometer data received from the voice accelerometer 116. In some examples, the voice accelerometer data can help to identify further variances in the OE. Based on this variance, the VAD module can receive a voice accelerometer profile or filter to further adjust the OE gain profile to better achieve transparency or equalization of bond conducted sound. The voice accelerometer profile may be pre-determined filters that are stored in memory. In some examples, the voice accelerometer profile may be stored in memory 112 of the wearable device 110 and/or stored and/or accessible from device 120. Based on the voice accelerometer data, a machine-learned model or an algorithm, such as least mean square, can be used to determine which voice accelerometer profile to select. For example, a voice accelerometer profile that would best adjust the OE profile to achieve transparency may be selected. The selected voice accelerometer profile may then be used to modify or adjust the OE gain profile. This allows for continuous updates to the OE gain profile and dynamic adjustments to the OE gains applied by the AHC block 118 based on the most up-to-date information. This may provide the user with a more natural listening experience as if the user was not wearing the wearable device.

The AHC block 118 may include an EQ module to apply gains to the audio output. A sound estimate may be determined based on received audio from the feedforward microphone 115A and may include an intensity and frequency of the received audio. Based on the sound estimate, the AHC block 118 may determine a gain to be applied such that the audio output provides a natural perfection of the ambient sounds. To provide the user a more natural listening experience, the EQ module may modify or adapt the audio output to provide ambient noise as part of the audio output to the user. That is, the EQ module may apply a gain to the received ambient noise such that the audio output is the same or similar to the user hearing the ambient noise without wearing the wearable device 110. The gain may be determined based on a pre-determined profile. This may provide the user a listening experience as if the user was not wearing the wearable device.

In some examples, the AHC block 118 may use a machine-learned model to determine how to adjust the audio output using each adjustment module OEC, VAD, EQ based on the adjusted OE gain profile. The machine-learned model may be trained to determine the amount of gain to apply for each adjustment module. Each training example may consist of audio output provided to the user. The input features to the machine-learned model may be the ambient and bone conducted sound received by the device to increase or decrease the playback volume, the ambient or background noise, etc. The machine-learned model may use the input features to more accurately determine the amount of gain to be applied by each of the adjustment modules. The output of the machine-learned model may be an amount of gain to be applied by each adjustment module of the AHC block 118.

In this example, the VAD module allows for the OE gain profile to be dynamically adjusted based on voice detection. This may provide for a more accurate OE gain profile such that the OE gain applied by the AHC block 118 is more accurate and can provide a user with better transparency.

In other examples, instead of starting with a fixed OE profile, the device 120 and/or the wearable device 110 may be used to create a real time OE profile and/or OE gain profile. VAD detection of bone-conducted voice may then be used to obtain an adjusted OE gain profile. The device 120 may instruct the wearable device 110 to perform a hearing test when the user is wearing wearable device 110 to determine the OE. According to some examples, the machine-learned model may use the new or updated OE profile as input to generate an OE gain profile, as well as a new or updated voice accelerometer profile as input to generate an adjusted OE gain profile.

Device 120 may each include one or more processors 121, memory 122, instructions 123, data 124, microphone(s) 125, voice accelerometer 126, wireless communication interface 127, and AHC block 128 that are substantially similar to those described herein with respect to wearable device 110.

Figure 2:
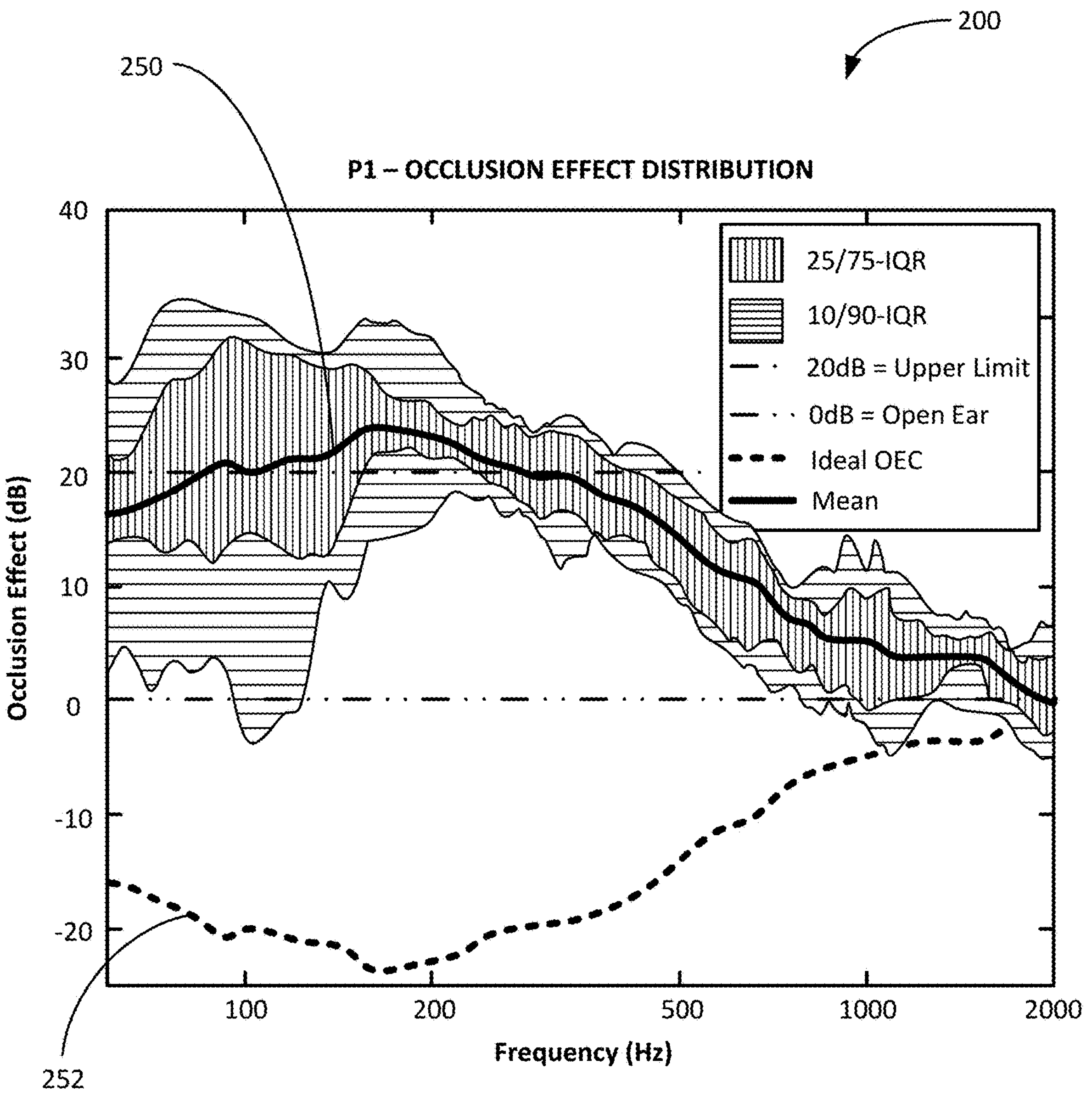
FIG. 2 is graphical representation illustrating example occlusion effects according to aspects of the disclosure.

FIG. 2 illustrates a graphical representation of the initial OE profile applied by the AHC block. As shown, graph 200 illustrates the occlusion effect distribution based upon a sampling of a plurality of users. An initial OE profile 250 represented by line 250 across frequencies ranging from 0 Hz to 2000 Hz. The initial OE profile 250 may be a fixed profile stored in the memory of the wearable device 110 and/or another device wirelessly connected to the wearable device 110, such as device 120. The OE profile curve represents the resulting distorted sound frequencies within the ear canal when the ear canal is occluded by an earbud or other device. The line 250 represents a fixed mean or average of the OE taken across the sampling of the plurality of users where the ear canal is occluded. In this example, the OE profile represents up to 50% of users. The OE further varies based on numerous factors, including, without limitation, the individual anatomy of a user, placement and orientation of the earbud within a user's ear, and individual hearing loss. The area indicated as "25/75-IQR" represents the variance for 25-75 percent of users, and the area indicated as "10/90-IQR", inclusive of the area indicated as "25/75-IQR", represents the variance for 10-90 percent of users.

Graph 200 further illustrates initial gains that may be applied to audio output by the OEC module. Based on the OE profile 250, an OE gain profile can be obtained. The OE gain profile 252 is represented by dotted line 252 and is shown across the same spectrum of frequencies. The OE gain profile 252 is a fixed gain profile and may be an inverse function of the OE profile 250. The OE gain profile 252 shows, for example, the gains or losses required to bring the OE profile 250 closer to 0 db so as to achieve transparency of sound. For example, at 100 Hz, approximately 20 dB in gains are required to bring the OE profile towards 0 db.

Figure 3:
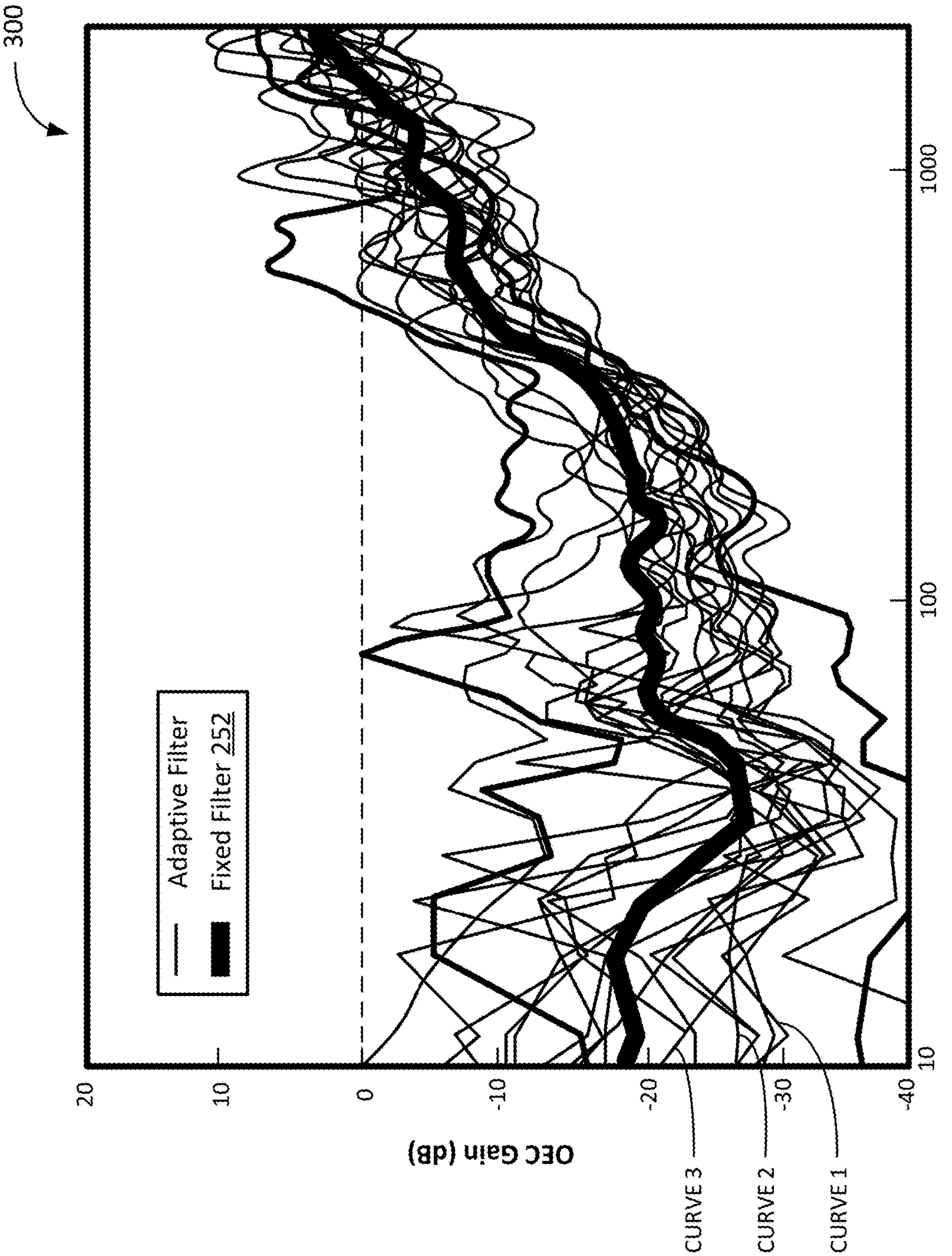
FIG. 3 is a graphical representation illustrating example occlusion effect gains according to aspects of the disclosure.

To better account for variances in the initial OE profile 250 and obtain a more accurate OE gain profile 252 that can improve transparency, an adaptive profile that takes voice data into consideration can be used to adjust the OE gain profile. In some examples, the VAD module can incorporate data related to the voice of a user to further adjust the OE gain profile 252. For example, based on data received from the voice accelerometer, which may include the spectrum of frequencies specific to the user's voice, the VAD module may select a voice accelerometer adaptive profile that can be used to adjust the OE gain profile. As shown in FIG. 3, an OE Gain v. Frequency graph 300 illustrates both the fixed and adaptive gain filters. For example, the fixed OE gain profile 252 is represented as the thickest line on the plot and, as previously discussed, represents an average OE gain profile 252 across a plurality of users. A plurality of voice accelerometer adaptive filters or profiles are further shown on graph 300, which can be used to actively adjust the OE gain profile 252 upwards or downwards. For example, Curve 1, Curve 2, and Curve 3 identify three of numerous voice accelerometer adaptive profiles on graph 300.

Table 1, below, is a chart of voice accelerometer adaptive profiles correlate with the curves or profiles identified on the voice accelerometer adaptive profiles shown in the graph 300. For example, Curve 1 represents the occlusion effect derived from voice data obtained from a user. The gains and/or losses of Curve 1 are generally referred to as "Gain 1" on Table 1, but the specific gains and losses are shown on the graph 300. These specific gains or losses at each frequency range can be used to adjust the initial OE gain curve upwards or downwards based on the identified gains. For example, Curve 1 shows that at a frequency of 10 Hz, a loss of approximately 10 dB is required to adjust the initial OE curve or profile 250 (FIG. 2) to bring the OE curve towards 0 db, whereas a gain of approximately 15 dB at a frequency of 100 Hz accounts for variances in the OE and helps to bring the OE curve towards 0 db. The same follows for Curve 2, Curve 3, and the remaining curves shown on Table 1.

TABLE 1

| Voice Accelerometer Adaptive Profile | OEC Adjustment |
|---|---|
| Curve 1 | Gain 1 |
| Curve 2 | Gain 2 |
| Curve 3 | Gain 3 |
| . . . | . . . |
| Curve n | Gain n |

Each voice accelerometer adaptive profile may be a pre-determined or pre-set profile based on collected voice data. For example, data regarding the OE in the ear canal due to voice when the ear canal is occluded by an earbud or earphone can be gathered. This data may be gathered in the actual environment under actual conditions or may be gathered in a simulated environment and simulated conditions or combinations of both actual and simulated environment and conditions. Various methods can be utilized to obtain the sampling. In one example, a microphone or other device configured to detect voice measurements can be placed between the feedback microphone 115B and within the ear canal to determine the OE of a person's voice in the ear canal when occluded by an earphone. In such example, based on the collected voice data, a single curve or voice accelerometer adaptive profile shown on graph 200 represents an individual user and the OE resulting from the individual user's voice. Alternatively, a single curve may represent an average of several users exhibiting similar characteristics, such as similar occlusion effect at the shown voice frequencies.

The accelerometer adaptive profiles may be stored in memory. The accelerometer adaptive profiles may be stored in the wearable device 110 and/or device 120 or any other device capable of storing the accelerometer adaptive profiles. In some examples, the VAD module may access the stored voice accelerometer adaptive profiles. Once the VAD module receives real time voice accelerometer data of a specific user, the VAD module can use the real time voice accelerometer data to determine or identify a voice accelerometer adaptive profile that would best adjust the OE gain curve to achieve transparency based on the individual user's voice. The VAD module can make this determination using an algorithm, such as least mean square, or by machine learning. The fixed OE gain curve 252 can then be adjusted upward or downward based on the voice accelerometer adaptive profile selected by the VAD module.

Figure 4:
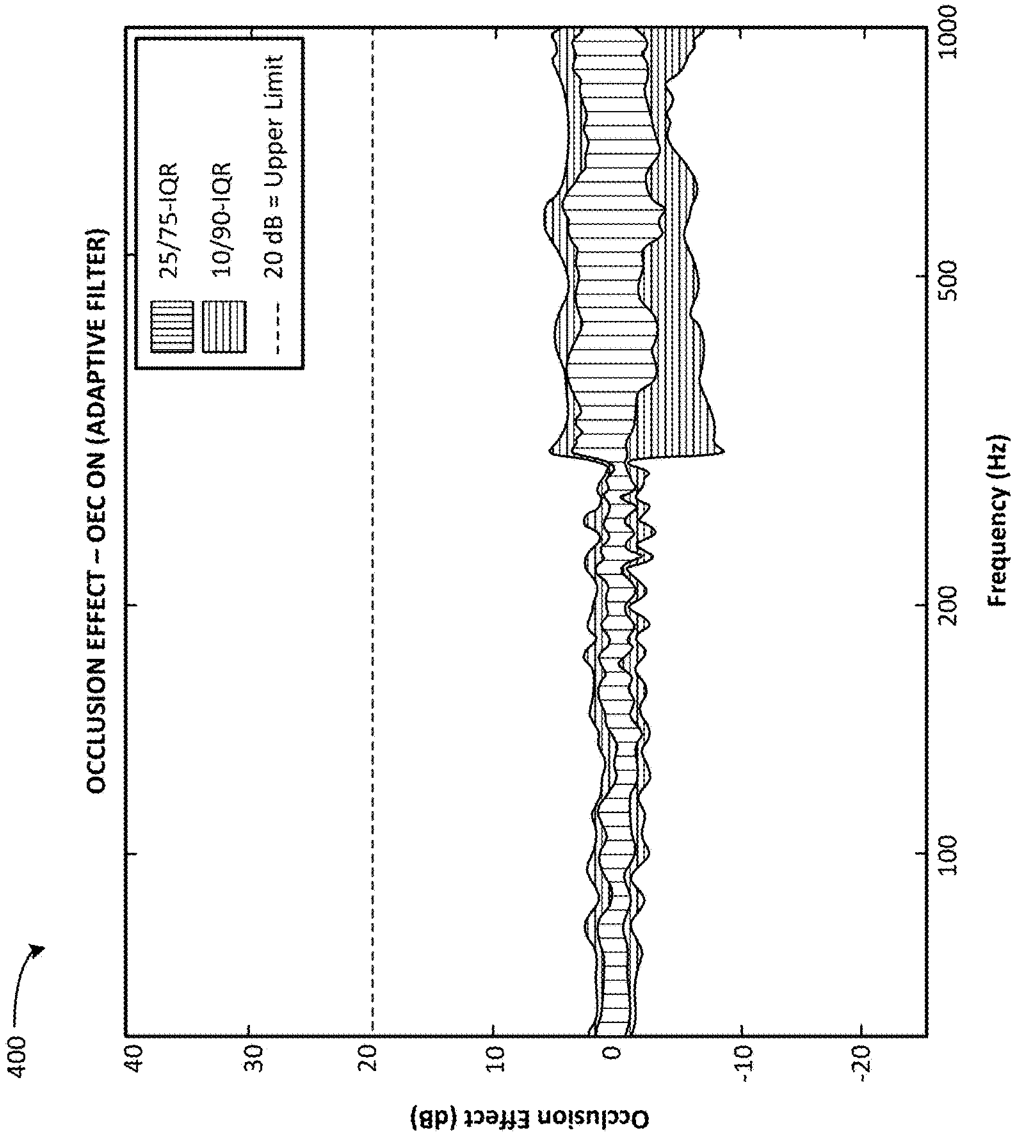
FIG. 4 is a graphical representation illustrating occlusion effects when implementing aspects of the disclosure.

With reference to FIG. 4, an updated graph 400 showing OE versus Frequency is illustrated, in which voice accelerometer adaptive curves (FIG. 3) have been used to adjust an OE gain profile to achieve improved transparency. The graph 400 illustrates that use of voice accelerometer data and the resulting voice accelerometer adaptive profile to adjust the OE gain profile can significantly improve transparency. The OE is substantially mitigated and approaches transparency (0 dB) at lower frequencies, such as 300 Hz and below when adjusting the OE gain profile based on voice accelerometer data. Further, transparency is more consistent at lower frequencies between 10-300 dB, than at the higher frequencies, such as 300 Hz and above.

The EQ module can be used to address transparency of ambient or air conducted sound. In some examples, an OE profile of ambient sound in an occluded ear can be obtained and a corresponding OE gain profile or plot can be determined to help achieve transparency of ambient sound. For example, an OE gain curve which is an inverse function of the OE profile can be obtained. While not required, in some examples, voice data, such as data from the voice accelerometer 116, can additionally be taken into consideration when determining the equalization necessary to achieve non-occluded or transparent ambient or air-conducted sound.

With the adjusted OE gain profile to address OE of bone-conducted sound, as well as equalization from the EQ model to address transparency of air-conducted sound, the AHC can adjust audio output to the user that will address the overall OE effect and achieve transparency of both air-conducted and bone-conducted sound. An algorithm, such as least mean square, or machine learning can be utilized to determine how to adjust audio output to the user.

It is to be appreciated that while the processes are described herein as being performed by the wearable device 110, some or all of the processes may be performed in one or more other devices.

Figure 5:
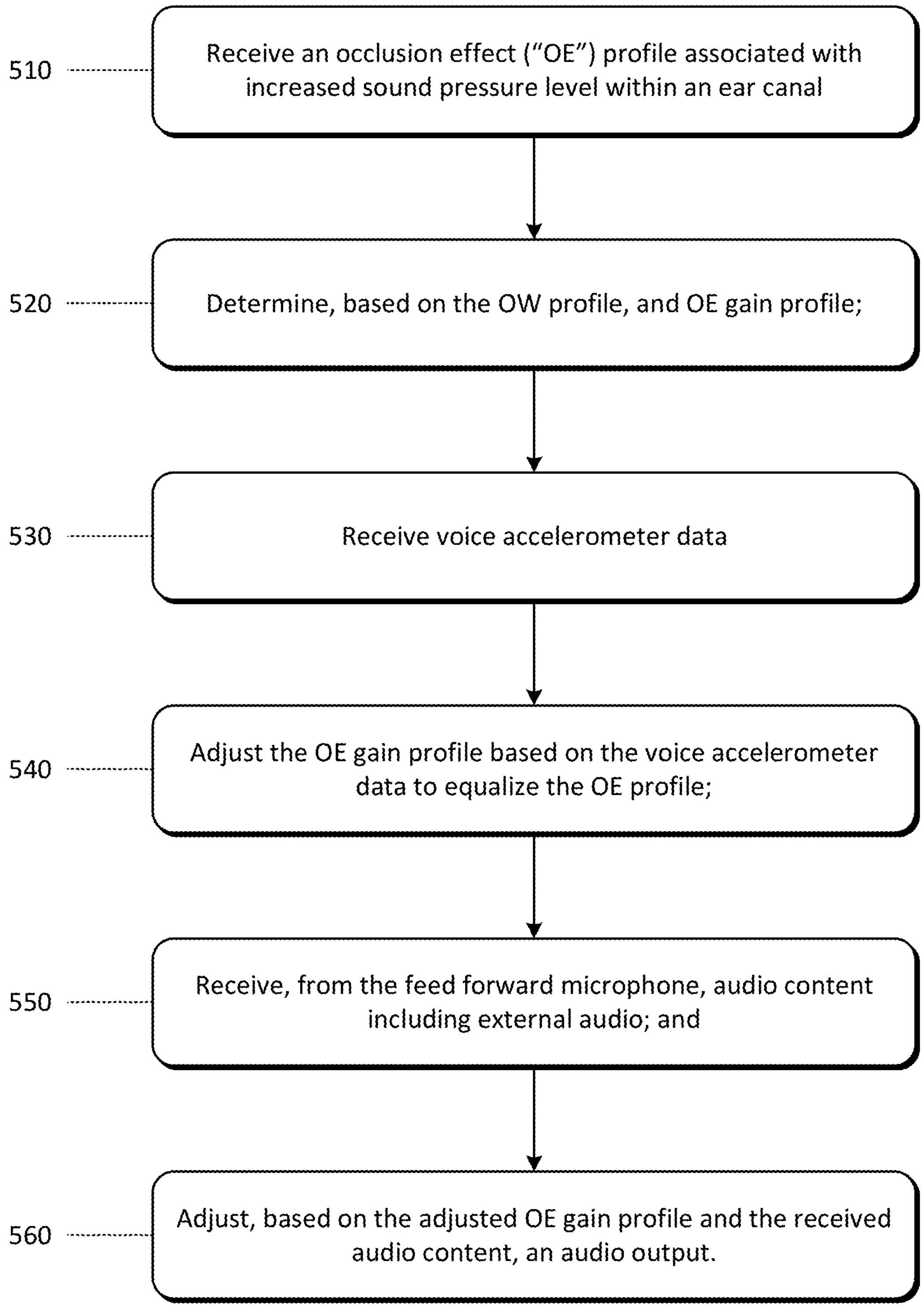
FIG. 5 is a flow diagram illustrating a method of adjusting an audio output according to aspects of the disclosure.

FIG. 5 illustrates an example method of adjusting an audio output of a wearable device based on an adjusted OE gain profile. The following operations do not have to be performed in the precise order described below. Rather various operations can be handed in a different order or simultaneously, and operations may be added or omitted.

For example, in block 510, the wearable device 110 may receive an OE profile associated with increased sound pressure level within an ear canal. The wearable device may be wirelessly connected to an external device 120. The external device may be, for example, a smartphone, tablet, laptop computer, etc.

In block 520, an OE gain profile may be determined based on the OE profile. The OE gain profile may include information identifying whether a positive or negative gain should be applied to the indicated frequencies.

In block 530, voice accelerometer data may be received. In some examples, the voice accelerometer data may be received by the AHC module.

In block 540, the OE gain profile may be adjusted based on the received voice accelerometer data. In one example, the voice accelerometer data can be used to identify a pre-determined filter that can adjust the OE gain profile. For example, the AHC module may access a plurality of stored voice accelerometer profiles that can be used to further adjust the OE gain profile and take voice into consideration. Once the adaptive voice accelerometer data profile is selected, the AHC module can adjust the OE gain profile.

In block 550, audio content, including external audio, may be received from the feedforward microphone. For example, audio content may be received from a feedforward microphone that is positioned on the exterior of a wearable device and that may transmit air-conducted or ambient sounds.

In block 560, based on the adjusted OE gain profile and the received audio content, an audio output may be adjusted. For example, using the adjusted OE gain profile that can adjust the OE gain profile for bone-conducted voice sounds and the audio content, which content can provide for equalization of ambient sound, an audio output can be adjusted.

To summarize the foregoing, a wearable device includes a feed forward microphone; a feedback microphone; a voice accelerometer; and one or more processors in communication with the feedforward microphone, the feedback microphone, and the voice accelerometer. The one or more processors may be configured to receive an OE profile associated with increased sound pressure level within an ear canal; determine an OE gain profile based on the OE profile; receive voice accelerometer data; adjust the OE gain profile based on the voice accelerometer data; generate an OE cancellation signal based on the OE gain profile to equalize the OE profile; receive, from the feed forward microphone, audio content including external audio; receive, from the feedback microphone, second audio content including audio within the ear canal of a user; and adjust, based on the OE cancellation signal and the received audio content, an audio output; and/or

- the one or more processors are configured to select a voice accelerometer adaptive profile based on the voice accelerometer data; and/or
- the one or more processors are configured to adjust the OE gain profile using the voice accelerometer adaptive profile; and/or
- the OE profile is a pre-determined OE profile that includes at least one of a positive gain or a negative gain for at least one frequency range; and/or
- the OE gain profile is an inverse function of the OE profile; and/or
- the OE gain profile is stored and accessible by the one or more processors; and/or
- the OE gain profile is calculated as an inverse function of the OE profile; and/or
- the OE gain profile is determined at least in part by a machine-learned model; and/or
- the adjusted OE gain profile includes a positive gain for at least one frequency; and/or
- after receiving voice accelerometer data, the one or more processors are further configured to adjust the OE gain profile to equalize the OE profile and to create an adjusted OE gain profile.

In another embodiment, a method comprises receiving, by one or more processors, an OE profile associated with increased sound pressure level within an ear canal; determining, based on the OE profile, an OE gain profile; receiving, from a voice accelerometer, voice accelerometer data; adjusting, by one or more processors, the OE gain profile to equalize the OE profile based on the voice accelerometer data; receiving, from one or more microphones, audio content including at least one of external audio and playback audio; and adjusting, based on the adjusted OE gain profile and the received audio content, an audio output; and/or

- selecting, by the one or more processors, a voice accelerometer adaptive profile based on the received voice accelerometer data; and/or
- the adjusting the OE effect gain profile further comprises adjusting the OE gain profile using the voice accelerometer adaptive profile based on the voice accelerometer data; and/or
- the OE profile is a pre-determined OE profile that includes at least one of a positive gain or a negative gain for at least one frequency range; and/or
- the voice accelerometer data is determined, in part, by audio content received from one or more microphones positioned near an ear canal of a user; and/or equalizing, by one or more processors, audio input received from one or more microphones positioned external to the ear, the equalizer providing the audio content; and/or the OE profile is stored in a memory, and the method further comprises accessing by the one or more processors, the stored OE profile; and/or determining by the one or more processors, the OE gain profile by obtaining an inverse function of the predetermined OE profile; and/or the adjusted OE gain profile includes a positive gain or a negative gain for at least one frequency range; and/or the voice accelerometer data is used to obtain a voice accelerometer adaptive gain profile used to adjust the OE gain profile.

A non-transitory computer readable medium storing instructions, which when executed by one or more processors, cause the one or more processors to: receive an OE profile associated with increased sound pressure level within an ear canal; determine an OE gain profile based on the OE profile; receive voice accelerometer data; adjust the OE gain profile based on the voice accelerometer data to equalize the OE profile; receive, from one or more microphones, audio content including external audio; and adjust, based on the adjusted OE gain profile and the received audio content, an audio output; and/or the profile includes a positive gain or a negative gain for at least one frequency range; and/or the voice accelerometer data is used to obtain a voice accelerometer adaptive gain profile used to adjust the OE gain profile.

It is to be understood that the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

ADDITIONAL EXAMPLES

In the following section, examples are provided.

Example 1: A method comprising: receiving, by one or more processors (111, 121), an occlusion effect ("OE") profile (250) associated with increased sound pressure level within an ear canal; determining, based on the OE profile (250), an OE gain profile (252); and generating, based on the OE gain profile (252), an OE cancellation signal to equalize the OE profile.

Example 2: The method of example 1, further comprising receiving, from one or more microphones (130, 132), audio content including audio associated audio within the ear canal of a user, and adjusting the OE cancellation signal based on the received audio content.

Example 3: The method of any of examples 1 and 2, further comprising: receiving, from one or more microphones (130, 132), audio content including external audio, and adjusting the OE cancellation signal based on the received audio content.

Example 4: The method of example 3, further comprising adjusting an audio output based on the adjusted OE cancellation signal.

Example 5: The method of any of examples 1 through 5, further comprising: receiving, from a voice accelerometer (116, 126), voice accelerometer data; and adjusting the OE gain profile (252) based on the voice accelerometer data.

Example 6: The method of example 5, wherein the voice accelerometer data is based on vibration of a bone of a user, the vibration caused by a user's voice.

Example 7: The method of examples 5 or 6, wherein the adjusting the OE gain profile (252) based on the voice accelerometer data further comprises: determining a voice accelerometer adaptive profile (Curve 1, Curve 2, Curve 3) based on the voice accelerometer data; and adjusting the OE gain profile (252) based on the voice accelerometer adaptive profile (Curve 1, Curve 2, Curve 3).

Example 8: The method of example 7, wherein the determined voice accelerometer adaptive profile (Curve 1, Curve 2, Curve 3) is one of a plurality of available voice accelerometer adaptive profiles.

Example 9: The method of any one of examples 1 through 8, wherein the OE gain profile (252) is determined at least in part by a machine-learned model.

Example 10: The method of any one of examples 1 through 9, wherein the received OE profile (250) is one of a plurality of available OE profiles.

Example 11: The method of any one of examples 1 through 10, wherein the OE gain profile (252) is an inverse function of the OE profile (250).

Example 12: The method of any one of examples 1 through 11, wherein the OE gain profile (252) is comprised of at least one positive or negative gain value.

Example 13: A non-transitory computer readable medium (112, 122) storing instructions (113, 123), which when executed by one or more processors (111, 121) cause the one or more processors (111, 121) to perform a method of any one of the example methods 1 through 12.

Example 14: A system (100) including: one or more microphones (130, 132); one or more voice accelerometers (116); one or more processors (111, 121); and memory (112, 122) comprising instructions (113, 123) stored thereon, which when executed by the one or more processors (111, 121) cause the one or more processors (111, 121) to perform a method of any one of the examples 1 through 12.

Example 15: The system of example 14, wherein the one or more processors (111, 121) are configured to generate the OE profile (250).

Example 16: A wearable device (110), comprising: one or more processors (111, 121) configured to: receive an occlusion effect ("OE") profile (250) based on an increased sound pressure level within an ear canal; determine, based on the OE profile (250), an OE gain profile (252); and generate, based on the OE gain profile (252), an OE cancellation signal to equalize the OE profile.

Example 17: The wearable device (110) of example 16, wherein the OE gain profile (252) is determined at least in part by a machine-learned model.

Example 18: The wearable device (110) of example 16 or 17, wherein the received OE profile (250) is one of a plurality of available OE profiles.

Example 19: The wearable device (110) of example 16, wherein the OE gain profile (252) is calculated as an inverse function of the OE profile (250).

Example 20: The wearable device (110) of any one of examples 16 through 19, wherein the OE gain profile (252) is comprised of at least one positive or negative gain value Example 21: The wearable device (110) of any one of examples 16 through 20, further comprising one or more feedback microphones (115B) in communication with the one or more processors (111), the one or more feedback microphones (115B) configured to receive audio content including audio associated audio within the ear canal of a user, wherein the one or more processors (111) are further configured to adjust the OE cancellation signal based on the received audio content.

Example 22: The wearable device (110) of any one of examples 16 through 21, further comprising one or more feedforward microphones (115A) in communication with the one or more processors (111), the one or more feedforward microphones (115A) configured to receive audio content including external audio, wherein the one or more processors (111) are further configured to adjust the OE cancellation signal based on the received audio content.

Example 23: The wearable device (110) of any one of examples 16 through 22, further comprising a voice accelerometer (116) in communication with the one or more processors (111), the voice accelerometer (116) configured to receive data, wherein the one or more processors (111) are further configured to adjust the OE gain profile (252) based on the voice accelerometer data.

Example 24: The wearable device (110) of example 23, wherein the OE gain profile (252) is adjusted at least in part by a machine-learned model.

Example 25: The wearable device (110) of example 23 or 24, wherein the one or more processors (111) are further configured to: determine a voice accelerometer adaptive profile based on the voice accelerometer data; and adjust the OE gain profile (252) based on the voice accelerometer adaptive profile.

CONCLUSION

Although implementations of devices, methods, and systems directed to reducing the occlusion effect have been described in language specific to features and/or methods, it is to be understood that the subject of the appended claims is not necessarily limited to the specific features or methods described. Rather, the specific features and methods are disclosed as example implementations of devices, methods, and systems directed to reducing the occlusion effect.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A method comprising:

receiving, by one or more processors, an occlusion effect ("OE") profile associated with an increased sound pressure level within an ear canal of a user;

determining, based on the OE profile, an OE gain profile;

receiving, from a voice accelerometer, voice accelerometer data;

adjusting the OE gain profile based on the voice accelerometer data; and generating, based on the adjusted OE gain profile, an OE cancellation signal to equalize the OE profile.

2. The method of claim 1, further comprising:

receiving, from one or more microphones, audio content including audio associated with audio within the ear canal of the user; and further adjusting the OE cancellation signal based on the received audio content.

3. The method of claim 1, further comprising:

receiving, from one or more microphones, audio content including external audio; and further adjusting the OE cancellation signal based on the received audio content.

4. The method of claim 3, further comprising adjusting an audio output based on the adjusted OE cancellation signal.

5. The method of claim 1, wherein the voice accelerometer data is based on a vibration of a bone of the user, the vibration caused by a voice of the user.

6. The method of claim 1, wherein the adjusting the OE gain profile based on the voice accelerometer data further comprises:

determining a voice accelerometer adaptive profile based on the voice accelerometer data; and further adjusting the adjusted OE gain profile based on the voice accelerometer adaptive profile.

7. The method of claim 6, wherein the determined voice accelerometer adaptive profile is one of a plurality of available voice accelerometer adaptive profiles.

8. The method of claim 1, wherein the adjusted OE gain profile is determined at least in part by a machine-learned model.

9. The method of claim 1, wherein the received OE profile is one of a plurality of available OE profiles.

10. A system including:

one or more microphones;

one or more voice accelerometers;

one or more processors; and a memory comprising instructions stored thereon, which when executed by the one or more processors cause the one or more processors to:

receive an occlusion effect ("OE") profile associated with an increased sound pressure level within an ear canal of a user;

determine, based on the OE profile, an OE gain profile;

receive, from the one or more voice accelerometers, voice accelerometer data;

adjust the OE gain profile based on the voice accelerometer data; and generate, based on the adjusted OE gain profile, an OE cancellation signal to equalize the OE profile.

11. The system of claim 10, wherein the instructions further cause the one or more processors to generate the OE profile.

12. The system of claim 10, wherein the instructions further cause the one or more processors to:

receive, from the one or more microphones, audio content including audio associated audio within the ear canal of the user; and adjust the OE cancellation signal based on the received audio content.

13. The system of claim 10, wherein the instructions further cause the one or more processors to:

receive, from the one or more microphones, audio content including external audio; and adjust the OE cancellation signal based on the received audio content.

14. The system of claim 10, wherein the voice accelerometer data is based on vibration of a bone of the user, the vibration caused by a voice of the user.

15. A non-transitory computer-readable medium storing instructions that, when accessed by one or more processors, cause the one or more processors to:

receive an occlusion effect ("OE") profile associated with an increased sound pressure level within an ear canal of a user;

determine, based on the OE profile, an OE gain profile;

receive, from one or more voice accelerometers, voice accelerometer data;

adjust the OE gain profile based on the voice accelerometer data; and generate, based on the adjusted OE gain profile, an OE cancellation signal to equalize the OE profile.

16. The non-transitory computer-readable medium of claim 15, wherein the OE gain profile is an inverse function of the OE profile.

17. The non-transitory computer-readable medium of claim 15, wherein the OE gain profile is comprised of at least one of a positive gain value or a negative gain value.

18. The non-transitory computer-readable medium of claim 15, wherein the voice accelerometer data is based on a vibration of a bone of the user, the vibration caused by a voice of the user.

19. The non-transitory computer-readable medium of claim 15, wherein:

the adjusting the OE gain profile based on the voice accelerometer data further comprises determining a voice accelerometer adaptive profile based on the voice accelerometer data; and adjusting the OE gain profile is further based on the voice accelerometer adaptive profile.

20. The non-transitory computer-readable medium of claim 19, wherein the determined voice accelerometer adaptive profile is one of a plurality of available voice accelerometer adaptive profiles.

* * * * *